United States Patent [19]

Agapiou et al.

[11] Patent Number: 6,140,432
[45] Date of Patent: *Oct. 31, 2000

[54] POLYMERIZATION CATALYST SYSTEMS, THEIR PRODUCTION AND USE

[75] Inventors: Agapios Kyriacos Agapiou; Chi-I Kuo, both of Humble; Michael Elroy Muhle, Kingwood; Anthony Nicholas Speca, Kingwod, all of Tex.

[73] Assignee: Exxon Chemical Patents Inc., Houston, Tex.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/501,897

[22] Filed: Jul. 13, 1995

[51] Int. Cl.[7] .................................................. C08F 4/54
[52] U.S. Cl. .................. 526/141; 526/142; 526/130; 526/160; 526/151; 502/152; 502/132; 502/111; 502/124; 502/127; 502/156
[58] Field of Search ....................... 502/111, 124, 502/127, 152, 156, 132; 526/141, 142, 130, 160, 151

[56] References Cited

U.S. PATENT DOCUMENTS

| | | |
|---|---|---|
| 4,739,015 | 4/1988 | Toyota et al. . |
| 4,792,592 | 12/1988 | Fulks et al. . |
| 4,808,667 | 2/1989 | Goko et al. . |
| 4,855,370 | 8/1989 | Chirillo et al. . |
| 4,868,288 | 9/1989 | Meier . |
| 4,876,320 | 10/1989 | Fulks et al. . |
| 4,957,946 | 9/1990 | Meier et al. . |
| 4,978,722 | 12/1990 | Goko et al. . |
| 5,026,795 | 6/1991 | Hogan . |
| 5,034,481 | 7/1991 | Funk et al. . |
| 5,037,905 | 8/1991 | Cummings et al. . |
| 5,106,927 | 4/1992 | Rifi et al. . |
| 5,116,940 | 5/1992 | Eisinger . |
| 5,126,414 | 6/1992 | Cooke et al. . |
| 5,162,463 | 11/1992 | Baker et al. . |
| 5,194,526 | 3/1993 | Hussein et al. . |
| 5,200,477 | 4/1993 | Baker et al. . |
| 5,200,502 | 4/1993 | Kao et al. . |
| 5,252,677 | 10/1993 | Tomita et al. . |
| 5,280,057 | 1/1994 | Nesvadba . |
| 5,283,278 | 2/1994 | Daire et al. . |
| 5,329,032 | 7/1994 | Tran et al. ............................... 526/141 |
| 5,373,072 | 12/1994 | Chang ....................... 526/129 |
| 5,397,757 | 3/1995 | Mink et al. ............................. 526/129 |
| 5,410,002 | 4/1995 | Govoni et al. .......................... 526/138 |
| 5,468,702 | 11/1995 | Jejelowo ................. 526/129 |
| 5,529,965 | 6/1996 | Chang ..................... 526/113 |
| 5,547,675 | 8/1996 | Canich .................... 502/117 |
| 5,552,358 | 9/1996 | Speca ...................... 526/141 |

FOREIGN PATENT DOCUMENTS

| | | |
|---|---|---|
| 2088524 | 8/1993 | Canada . |
| 0059080B1 | 9/1982 | European Pat. Off. . |
| 0229368B1 | 7/1987 | European Pat. Off. . |
| 0232701B1 | 8/1987 | European Pat. Off. . |
| 0362629A2 | 4/1990 | European Pat. Off. . |
| 0364759A2 | 4/1990 | European Pat. Off. . |
| 0417710A2 | 3/1991 | European Pat. Off. . |
| 0 435 514 A2 | 7/1991 | European Pat. Off. . |
| 0442725A3 | 8/1991 | European Pat. Off. . |
| 0449519A2 | 10/1991 | European Pat. Off. . |
| 0453116A1 | 10/1991 | European Pat. Off. . |
| 0518093A1 | 12/1992 | European Pat. Off. . |
| 0533452A1 | 3/1993 | European Pat. Off. . |
| 0549252A1 | 6/1993 | European Pat. Off. . |
| 0560035A1 | 9/1993 | European Pat. Off. . |
| 0561476A1 | 9/1993 | European Pat. Off. . |
| 560035 | 9/1993 | European Pat. Off. . |
| 0 638 595 A2 | 2/1995 | European Pat. Off. . |
| WO 92/05203 | 4/1992 | WIPO . |
| WO 94/26793 | 11/1994 | WIPO . |

OTHER PUBLICATIONS

Activation of $SiO_2$-supported Zirconocene Catalysts by Common Trialkylaluminums; Makromol Chem 194, 3499–3504 (1993).

Polymerization fo Ethylene and propylene with Homogeneous Titanocene Catalysts Modified by Trimethylsilanol; European Polymer Journal 30(1994) Nov., No. 11, Kidlington, Oxford GB.

*Primary Examiner*—David W. Wu
*Assistant Examiner*—Ling-Siu Choi
*Attorney, Agent, or Firm*—Paige Schmidt; Myron B. Kurtzman

[57] ABSTRACT

This invention is generally directed toward a supported catalyst system useful for polymerizing olefins. The method for supporting the catalyst of the invention provides for a supported metallocene catalyst which when utilized in a polymerization process substantially reduces reactor fouling and sheeting in a gas or slurry polymerization process.

30 Claims, No Drawings

POLYMERIZATION CATALYST SYSTEMS, THEIR PRODUCTION AND USE

FIELD OF THE INVENTION

This invention relates to a method for the production of metallocene catalyst systems, catalyst systems resulting from such method and the use of such systems in olefin polymerization processes. The invention particularly relates to a method for preparing a supported metallocene catalyst system which is particularly suitable for use in gas phase and slurry polymerization processes and which results in improved reactor operability.

BACKGROUND OF THE INVENTION

It is widely known that olefin polymerization processes utilizing bulky ligand transition metal catalysts, otherwise known as metallocene catalysts, have produced a diverse array of new polymers which are useful in a wide variety of applications and products.

A well known problem associated with the use of metallocene catalyst systems is their tendency to cause fouling and/or sheeting in gas phase and slurry polymerization processes. Fouling on the walls of the reactor and/or reactor components results in many serious problems including poor heat transfer, particle morphology, and reactor shutdown.

In an effort to solve these problems, many catalyst system modifications and modifications to the polymerization conditions have been reported. For example, U.S. Pat. Nos. 4,792,592; 4,808,667; 4,855,370; 4,876,320; 4,978,722; 5,026,795; 5,034,481; 5,037,905 are all directed toward the use of antistatic agents or other additives.

While these approaches may reduce fouling or sheeting somewhat, they are not generally useful with all catalyst systems, they may be expensive to employ, and they may not reduce both fouling and sheeting to a level sufficient for the successful operation of a continuous process, particularly a commercial or large-scale process. Thus, it would be highly advantageous to have an improved metallocene catalyst system that in a polymerization process would significantly enhance reactor operability by reducing both fouling and sheeting.

SUMMARY OF THE INVENTION

This invention is generally directed towards a method for the manufacture of supported metallocene catalyst systems, to catalyst systems resulting from such method, and to use of such catalyst systems in polymerization processes.

In one embodiment a method is provided to produce a supported bulky ligand transition metal catalyst system by contacting a carrier with an activator, a metallocene catalyst component and a surface modifier.

Another embodiment of the invention relates to a process for producing polyolefins by contacting olefin monomer, optionally with at least one comonomer in the presence of the catalyst system resulting from the method described above.

The method for forming the catalyst system of the invention results in a metallocene catalyst system with improved reactor operability. This catalyst system not only reduces fouling and sheeting in a gas phase or slurry polymerization process but the catalyst system itself has better flow properties which facilitate its delivery into the reactor. Also, the catalyst system of this invention results in a high bulk density polymer product having improved physical properties.

In a preferred embodiment, a continuous gas phase process is employed in which a continuous recycle stream is heated by the heat of polymerization, and in another part of the cycle, heat is removed by a cooling system external to the reactor. Fouling in this continuous gas phase process can lead to ineffective operation of various reactor systems, such as the cooling system, temperature probes, and the distributor plate. The tendency to foul is greatly increased in a gas phase operation where a liquid is purposefully introduced into the reactor to increase cooling capacity. This type of gas phase process is known in the industry as a condensed mode polymerization process and is described in U.S. Pat. Nos. 4,543,399, 4,588,790 and 5,342,749. The liquid utilized in this process is preferably an inert hydrocarbon in which the metallocene and its activator are quite soluble. The cooling liquid, therefore, can cause the components of a supported catalyst system to dissassociate from the support. This disassociation increases the tendency toward fouling. Also, in a slurry or bulk liquid pool polymerization process, solvent and monomer such as isobutane, propylene, butene or hexene can affect the various components of a metallocene system in the same way.

The invention provides for method form preparing a polymerization catalyst which results in a catalyst system exhibiting improved reactor operability, by reducing the fouling and/or sheeting tendencies, in a continuous process.

DETAILED DESCRIPTION

Catalyst Components and Catalyst Systems of the Invention

Metallocenes are generally represented by the formula:

$$[L]_mM[A]_n$$

where L is a bulky ligand; A is leaving group, M is a transition metal and m and n are such that the total ligand valency corresponds to the transition metal valency. Preferably the catalyst is four coordinate such that the compound is ionizable to a $1^+$ charge state.

The ligands L and A may be bridged to each other, and two L ligands may be present and bridged and/or two A ligands may be present and bridged. The metallocene compound may be full-sandwich compounds having two or more ligands L, which may be cyclopentadienyl ligands or cyclopentadiene-derived ligands, or half-sandwich compounds having one ligand L, which is a cyclopentadienyl ligand or derived ligand.

In one embodiment, at least one ligand L has a multiplicity of bonded atoms, preferably carbon atoms, which typically are arranged in a cyclic structure such as, for example, a cyclopentadienyl ligand, substituted or unsubstituted, or cyclopentadienyl derived ligand or any other ligand capable of η-5 bonding to the transition metal atom. One or more bulky ligands may be π-bonded to the transition metal atom. The transition metal atom may be a Group 4, 5 or 6 transition metal and/or a metal from the lanthanide or actinide series. Other ligands may be bonded to the transition metal, such as a leaving group, such as but not limited to hydrocarbyl, hydrogen or any other univalent anionic ligand. Non-limiting examples of metallocene catalysts and catalyst systems are discussed in for example, U.S. Pat. Nos. 4,530,914; 4,871,705; 4,937,299; 4,952,716; 5,124,418; 5,017,714; 5,120,867; 5,278,264; 5,278,119; 5,304,614; 5,324,800; 5,347,025; 5,347,023; 5,391,789; and 5,391,790 each of which is herein fully incorporated by reference. Also, the disclosures of EP-A-0 591 756, EP-A-0 520 732, EP-A-0 420 436, WO 91/04257 WO 92/00333, WO 93/08221, WO 93/08199 and WO 94/01471 are each fully incorporated herein by reference.

Further, the metallocene catalyst component of the invention can be a monocyclopentadienyl heteroatom containing compound. This monocyclopentadienyl heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, each of which is fully incorporated herein by reference. In addition, the metallocene catalyst systems useful in this invention can include non-cyclopentadienyl catalyst components, or ancillary ligands such as boroles or carbollides in combination with a transition metal. Additionally included are the metallocene catalysts and catalyst systems described in U.S. Pat. Nos. 5,064,802, 5,149,819, 5,243,001, 5,239,022, 5,276,208, 5,296,434, 5,321,106, 5,329,031 and 5,304,614, PCT publications WO 93/08221 and WO 93/08199 and EP-A-0 578 838 each of which is herein fully incorporated by reference.

The preferred transition metal component of the catalyst system of the invention are those of Group 4, particularly, zirconium, titanium and hafnium. The transition metal may be in any oxidation state, preferably +3 or +4 or a mixture thereof.

"Metallocene" as used herein means a catalyst component containing one or more cyclopentadienyl moieties in combination, with a transition metal. In one embodiment the metallocene catalyst component is represented by the general formula $(C_p)_m MR_n R'_p$ wherein at least one $C_p$ is an unsubstituted or, preferably, at least one Cp is a substituted cyclopentadienyl ring, symmetrical or unsymetrically substituted; M is a Group 4, 5 or 6 transition metal; R and R' are independently selected from halogen, hydrocarbyl group, and hydrocarboxyl groups having 1–20 carbon atoms or combinations thereof; m=1-3, n=0-3, p=0-3, and the sum of m+n+p equals the oxidation state of M, preferably m=2, n=1 and p=1.

In another embodiment the metallocene catalyst component is represented by one of the formulas:

$(C_5R'_m)_p R''_s (C_5R'_m) MQ_{3-p-x}$ and $R''_s (C_5R'_m m)_2 MQ'$ wherein Me is a Group 4, 5, 6 transition metal, at least one $C_5R'_m$ is a substituted cyclopentadienyl, each R', which can be the same or different, is hydrogen, alky, alkenyl, aryl, alkylaryl or arylalkyl radical having from 1 to 20 carbon atoms or two carbon atoms joined together to form a part of a substituted or unsubstituted ring or rings having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

In another embodiment, the metallocene catalyst component is as described in commonly owned copending U.S. application Ser. No. 581,841, now U.S. Pat. No. 5,096,867 which disclosed the discovery of a class of monocyclopentadienyl Group IV B transition metal compounds which, when activated with an alumoxane, may be employed as a catalyst system in solution, slurry or bulk phase polymerization procedure to produce a polyolefin of high weight average molecular weight and relatively narrow molecular weight distribution.

The "Group IV B transition metal component" of the catalyst system disclosed in application Ser. No. 581,841, now U.S. Pat. No. 5,096,867 is represented by the formula:

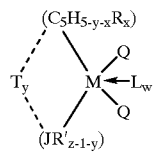

wherein M is Zr, Hf or Ti in its highest formal oxidation state (+4, $d^0$ complex); $(C_5H_{5-y-x}R_x)$ is a cyclopentadienyl ring which is substituted with from zero to five substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, and alkoxy radical or any other radical containing a Lewis acidic or basic functionality, $C_1$–$C_{20}$ hydrocarbyl-substituted metalloid radicals wherein the metalloid is selected from the Group IV A of the Periodic Table of Elements; halogen radicals, amido radicals, phosphido radicals, alkoxy radicals, alkylborido radicals or any other radical containing Lewis acidic or basic functionality; or $(C_5H_{5-y-x}R_x)$ is a cyclopentadienyl ring in which at least two adjacent R-groups are joined forming a $C_4$–$C_{20}$ ring to give a saturated or unsaturated polycyclic cyclopentadienyl ligand such as indenyl, tetrahydroindenyl, fluorenyl or octahydrofluorenyl;

(JR'z-1-y) is a heteroatom ligand in which J is an element with a coordination number of three from Group V A or an element with a coordination number of two from Group VI A of the Periodic Table of Elements, preferably nitrogen, phosphorus, oxygen or sulfur, and each R' is, independently a radical selected from a group consisting of $C_1$–$C_{20}$ hydrocarbyl radicals, substituted $C_1$–$C_{20}$ hydrocarbyl radicals wherein one or more hydrogen atoms are replaced by a halogen radical, an amido radical, a phosphido radical, an alkoxy radical or any other radical containing a Lewis acidic or basic functionality, and "z" is the coordination number of the element J;

each Q may be independently any univalent anionic ligand such as a halide, hydride, or substituted or unsubstituted $C_1$–$C_{20}$ hydrocarbyl, alkoxide, aryloxide, amide, arylamide, phosphide or arylphosphide, provided that where any Q is a hydrocarbyl such Q is different from $(C_5H_{5-y-x}R_x)$, or both Q together may be an alkylidene or a cyclometallated hydrocarbyl or any other divalent anionic chelating ligand;

"y" is 0 or 1 when w is greater than 0; y is 1 when w is 0; when "y" is 1, T is a covalent bridging group containing a Group IV A or V A element such as, but not limited to, a dialkyl, alkylaryl or diaryl silicon or germanium radical, alkyl or aryl phosphine or amine radical, or a hydrocarbyl radical such as methylene, ethylene and the like;

L is a neutral Lewis base such as diethylether, tetraethylammonium chloride, tetrahydrofuran, dimethylaniline, aniline, trimethylphosphine, n-butylainine, and the like; and "w" is a number from 0 to 3. L can also be a second transition metal compound of the same type such that the two metal centers M and M' are bridged by Q and Q', wherein M' has the same meaning as M and Q' has the same meaning as Q. Such dimeric compounds are represented by the formula:

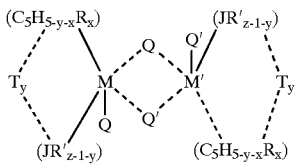

For the purposes of this patent specification, the terms "cocatalysts" and "activators" are used interchangeably and are defined to be any compound or component which can activate a bulky ligand transition metal compound or a metallocene, as defined above, to polymerize one or more monomers under polymerization conditions. It is within the scope of this invention to use alumoxane as an activator, and/or to also use ionizing activators, neutral or ionic, or compounds such as tri (n-butyl) ammonium tetra bis (pentaflurophenyl) boron or trisperfluoro phenyl boron metalloid precursor, which ionize the neutral metallocene compound.

Generally, the alkylalumoxanes preferred for use in olefin polymerization contain about 4 to 20 of the repeating units:

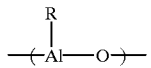

where R is a $C_1$–$C_8$ alkyl including mixed alkyls. Particularly preferred are the compounds where R is methyl. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference.

Some methylalumoxane (MAO) solutions tend to become cloudy and gelatinous over time. It may be advantageous to clarify such solutions prior to use. A number of methods may be used to create gel-free MAO solutions or to remove gels from the solutions. Gelled solutions are often simply shaken or decanted. U.S. Pat. No. 5,157,137 discloses a process for forming clear, gel-free solutions of alkylalumoxane by treating a solution of alkylalumoxane with an anhydrous salt and/or hydride of an alkali or alkaline earth metal.

It is also within the scope of this invention to use ionizing activators, neutral or ionic, or compounds such as tri (n-butyl) ammonium tetrakis(pentaflurophenyl) boron, which ionize the neutral metallocene compound. Such ionizing compounds may contain an active proton, or some other cation associated with but not coordinated or only loosely coordinated to the remaining ion of the ionizing compound. Combinations of activators are also contemplated by the invention, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient ability to permit displacement by an ethylenically or acetylenically unsaturated monomer during polymerization.

The use of ionizing ionic compounds not containing an active proton but capable of producing both the active metallocene cation and an noncoordinating anion is also known. See, EP-A-0 426 637 and EP-A-0 573 403 (incorporated herein by reference). An additional method of making the ionic catalyst systems uses ionizing anion precursors which are initially neutral Lewis acids but form the cation and anion upon ionizing reaction with the metallocene compounds, for example the use of tris (pentafluorophenyl) boron. See EP-A-0 520 732 (incorporated herein by reference). Ionic catalysts for addition polymerization can also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Methods of supporting ionic catalysts comprising metallocene cations and noncoordinating anions are described in WO91/09882, WO 94/03506 and in co-pending U.S. Ser. No. 08/248,284, filed Aug. 3, 1994 now abandoned (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

In another embodiment of the invention two or more metallocene catalyst components can be combined. For example, mixed catalysts are described in U.S. Pat. No. 5,281,679 and U.S application Ser. No. 138,818 filed Oct.

14, 1993 U.S. Pat. No. 5,466,649 both of which are fully incorporated herein by reference. Also, at least one metallocene catalyst can be combined with a non-metallocene or traditional Ziegler-Natta catalyst or catalyst system, non-limiting examples are described in U.S. Pat. Nos. 4,701,432, 5,124,418, 5,077,255 and 5,183,867 all of which are incorporated herein by reference.

For purposes of this patent specification the terms "carrier" or "support" are interchangeable and can be any support material, preferably a porous support material, such as for example, talc, inorganic oxides, inorganic chlorides, and resinous support materials which include polystyrene or polystyrene divinyl benzene polyolefins or polymeric compounds or any other organic support material and the like, or mixtures thereof.

The preferred support materials are inorganic oxide materials, which include those of Groups 2, 3, 4, 5, 13 or 14 metal oxides. More preferable support materials include silica, alumina, silica-alumina, and mixtures thereof. Other inorganic oxides that may be employed either alone or in combination with the silica, alumina or silica-alumina are magnesia, titania, zirconia, and the like.

Preferably, the support material has a surface area in the range of from about 10 to about 700 m²/g, a pore volume in the range of from about 0.1 to about 4.0 cc/g and an average particle size in the range of from about 10 to about 500 μm. More preferably, the surface area of the support material is in the range of from about 50 to about 500 m²/g, pore volume of from about 0.5 to about 3.5 cc/g and the average particle size of from about 20 to about 200 μm. Most preferably the surface area range is from about 100 to about 400 m²/g, pore volume from about 0.8 to about 3.0 cc/g and average particle size is from about 10 to about 100 μm. The pore size of the support material is typically in the range of from about 10 to about 1000 Å, preferably about 50 to about 500 Å, and most preferably about 75 to about 350 Å.

The term "surface modifier" is defined herein as any organic compound containing at least one electron rich heteroatom from Groups IV, V and/or VI in addition to a hydrocarbyl moiety. Typical of such heteroatoms are silicon, oxygen, nitrogen, phosphorus, and sulfur. The surface modifier may also contain at least one active hydrogen atom attached to the heteroatom. The hydrocarbyl moiety should have a molecular weight sufficient to give it solubility in typical hydrocarbon solvents such as cyclic aliphatic or aromatic hydrocarbons. The surface modifier can be represented by the formula, $R_m XH_n$ where R may be a branched or straight chain hydrocarbyl group or substituted hydrocarbyl group or groups having one or more carbon atoms and where X is at least one heteroatom, which can be O, N, P or S atoms or a combination thereof; and H is an active hydrogen and n is such that the compound has no net charge.

Non limiting examples of surface modifiers include the following general structures wherein R represents the hydrocarbyl groups: $RNH_2$, $R_2NH$, $(R'C(OH)_nR'')NH_2$, $(R'C(OH)_nR'')_2NH$, $RCONH_2$, $RCONHR$, $RN(ROH)_2$, $RCO_2H$, $RC(O)NROH$, $RC(S)OH$, $R_3N$, $RCO_2R'$ and $R_2PO_2H$ or, alternatively, $RN(CH_2CH_2OH)_2$ wherein R is a $C_8$ to $C_{18}$ hydrocarbyl group. These compounds include amines, alcohols, phenols, thiols, silanols, diols, acids, esters and ethers.

In another embodiment the surface modifier of this invention can be expressed by the formula:

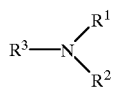

where $R^3$ is hydrogen or a branched or linear alkyl group having 1 to 50 carbon atoms. $R^1$ and $R^2$ may be the same or different and may be the same as $R^3$ or contain another heteroatom such as O, N, P or S.

In another embodiment, the surface modifier is represented by the following formula for an alkoxylated tertiary amine:

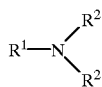

where $R^1$ may be hydrogen or a (linear or branched) alkyl group of from 1 to 50 carbon atoms; $R^2$ may be a hydroxy group such a $(CH_2)_xOH$ radical where x is an integer from 1 to 50, preferably 2 to 25. Non-limiting examples include Kemamine AS-990 (available from Witco Chemical Corporation, Houston, Tex.) having the formula $C_{18}H_{37}N(CH_2CH_2OH)_2$ and Kemamine AS-650 (also available from Witco) having the formula $C_{12}H_{25}N(CH_2CH_2OH)_2$. Other surface modifiers can include bishydroxyethylcocoamine, 2,2-(octadecylamino)bis ethanol, polyoxyethylene alkylamine, butyl stearate, glycerol and SPAN-80 (available from ICI Specialties, Wilmington, Del.) having the formula:

 (sorbitan mono-oleate).

Quaternary ammonium compounds, hydrocarbyl sulfates or phosphates can also be used as surface modifiers. Tertiary amines, ethoxylated amines and polyether compounds are preferred surface modifiers.

Methods of Producing the Catalyst System of the Invention

At least one component of the catalyst system in addition to the surface modifier is supported on a porous support material. Any support technique may be used. Examples of catalyst component and/or system supporting techniques which may be used in the invention are described in U.S. Pat. Nos. 4,937,217; 4,912,075; 4,935,397; 4,937,301; 4,914,253; 5,008,228; 5,086,025; 5,147,949; 4,808,561; 4,897,455; 4,701,432; 5,238,892; 5,240,894; 5,332,706; and U.S. patent application Ser. Nos. 138,818, filed Oct. 14, 1993; 170,108, filed Dec. 20, 1993 now abandoned; 182, 244, filed Jan. 14, 1994 now abandoned; 233,668, filed Apr. 26, 1994 now abandoned; 271,598, filed Jul. 7, 1994 now U.S. Pat. No. 5,468,702; and 287,327, filed Aug. 8, 1994 now U.S. Pat. No. 5,489,024, each of which is fully incorporated herein by reference. This invention in one embodiment relates to the addition of a surface modifier at any point during the preparation of any of the catalyst systems described in these patents and patent applications. Preferably, however, the surface modifier is added as the last component. Thus, at least one metallocene catalyst component, at least one activator, at least one carrier and at least one surface modifier are combined in any order to form the supported catalyst system of the invention.

The catalyst system components may be supported separately or together. Preferably, the metallocene catalyst component and its activator are combined first to form a solution of their reaction product. This reaction product solution is preferably then combined with the support material followed by the addition of the surface modifier. After the reaction product solution is combined with the support material then the mixture is preferably dried and/or washed and dried. In another embodiment the surface modifier is added to the solution directly as a solid or slurried in a liquid, preferably one in which the catalyst components and the activator are insoluble. In another embodiment, the surface modifier is supported prior to contact with the activator and/or metallocene components. In another embodiment the surface modifier is dry blended with the metallocene catalyst component, the activator and the carrier. In another embodiment the metallocene catalyst component, the activator, and the surface modifier are first combined in a liquid in which all the components are soluble except the carrier and then the mixture is combined with the support material.

In one embodiment only solutions having a specified volume are brought into contact with the support material (whether containing one or more of the catalyst system component(s)). Preferably, the total volume combined with the support material is less than about 4 times the total pore volume of the support material, preferably less than about 3 times the total pore volume of the porous support, and most preferably, the total volume combined with the support material is in the range of from more than 1 times the total pore volume of the support material to about 2 times the total pore volume of the support material. Preferably, the solution is applied either dropwise or as a spray while the support is agitated or otherwise thoroughly mixed.

Generally, a slurry is formed when two phases are observable, one of which contains all or most of the support material. The volume of solution required to reach this stage will vary depending upon, among other things, the type of support material and type of catalyst system components. Just prior to the point at which a slurry is formed, is a stage which is defined herein as the "mud" stage. At the mud stage, the solution volume is such that, while two phases are not visible, the support material is saturated and the support particles are firmly packed together. Prior to the mud stage, the volume of solution is such that the support material appearance ranges from dry and free flowing (even though the support may contain close to one pore volume of solution) to dry but slightly sticky to variously damp and clumpy such as is the appearance of variously wet sand.

In any of the methods for producing the catalyst system of the invention described above, the weight percent of the surface modifier based on the total weight of the catalyst system should typically be in the range of 0.05 to about 10 weight percent, more preferably about 0.10 to about 5 weight percent and most preferably 0.25 to 3.5 weight percent.

The procedure for measuring the total pore volume of a porous support is well known in the art. Details of one of these procedures are discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration*, Vol. 28, No. 3, Analytical Chemistry 332–334 (March, 1956).

In another embodiment the supported catalyst is produced by contacting an organometallic compound, such as trimethyl aluminum with silica containing water, absorbed or adsorbed, within the carrier to form an activator, alumoxane for example. In this particular embodiment, the metallocene catalyst component is then added to the carrier and formed activator with or separately from a surface modifier, preferably after the metallocene has been added.

In another embodiment the mole ratio of the surface modifier to the metal of the metallocene catalyst component is in the range of from 0.05:1 to 10:1, preferably 0.2:1 to 5:1 and more preferably from 0.2:1 to 3:1.

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3:1.

Finally, the catalyst system of this invention may be prepolymerized in any prepolymerization process using any monomer/comonomer prior to use in the primary polymerization which is described in detail below.

Polymerization Process of the Invention

The catalyst systems of this invention are suited for polymerization of monomers and optionally comonomers in a gas phase, slurry, liquid pool or bulk polymerization process.

In the preferred embodiment, this invention is directed toward gas phase polymerization or copolymerization reactions involving polymerization of one or more of alpha-olefin monomers having from 2 to 20 carbon atoms, preferably 2–12 carbon atoms. The invention is particularly well suited to copolymerization reactions involving the polymerization of one or more alpha-olefin monomers such as ethylene, propylene, butene-1, pentene-1, 4-methylpentene-1, hexene-1, octene-1, decene-1, and cyclic olefins such as cyclopentene, and styrene or a combination thereof. Other monomers include polar vinyls, cyclobutene, norbornene, diolefins such as dienes, polyenes, norbornene, norbornadiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms. In another embodiment ethylene or propylene is polymerized with at least two different comonomers to form a terpolymer and the like, the preferred comonomers are a combination of alpha-olefin monomers having 3 to 15 carbon atoms, more preferably 4 to 10 carbon atoms.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670 and 5,352,749 and U.S. application Ser. No. 216,520, filed Mar. 22, 1994, U.S. Pat. No. 5,405,922, U.S. application Ser. No. 08/306,055 filed Sep. 14, 1994 now U.S. Pat. No. 5,763,543 all of which are fully incorporated herein by reference.

Generally in a gas fluidized bed process for producing polymer from monomers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

In another embodiment a surface modifier as described in this patent specification is introduced into the reactor together, separately or apart from the other catalyst components of the invention. These surface modifiers include alcohols, thiol, silanol, diol, ester, ketone, aldehyde, amine and ether compounds. Also, the catalyst system of the invention may be introduced into the reactor with a gas such as a nitrogen and/or a carbon monoxide mixture. Carbon monoxide is may be used as a retardant for the catalyst without substantially deactivating the catalyst, but rather suppressing the catalyst activity for a short period of time. This suppression in activity allows the catalyst to penetrate further into the reaction zone before polymerization initiation.

A slurry polymerization process involves pressures in the range of about 1 to about 500 atmospheres and even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, isobutylene, ethylbenzene or xylene. The medium employed should be liquid under the conditions of polymerization and relatively inert. Preferably, hexane or isobutane is employed.

In a preferred embodiment of the process of the invention the process is essentially free of a scavenger as is described in U.S. application Ser. No. 08/306,055, filed Sep. 14, 1994. For the purposes of this patent specification and appended claims a "scavenger" is any organometallic compound which is reactive towards oxygen and/or water and/or polar compounds and which does not include the catalyst components of the invention. Non-limiting examples of scavengers can be generally represented by the formula $R_nA$, where A is a Group 12 or 13 element, each R, which can be the same or different, is a substituted or unsubstituted, straight or branched alkyl radical, cyclic hydrocarbyl, alkyl-cyclo hydrocarbyl radicals or an alkoxide radical, where n is 2 or 3. Typical scavengers include trialkylaluminum compounds such as trimethylaluminum, triethylaluminum, triisopropyl aluminum, tri-sec-butyl aluminum, tri-t-butyl aluminum triisobutyl aluminum, trialkyl boranes and alkoxides and the like.

The phrase "essentially free of scavenger" as used herein means that during the process of the invention no more than 10 ppm of a scavenger based on the total weight of the recycle stream is present at any given point in time during the process of the invention.

Optionally, for the purpose of ensuring polymerization initiation during reactor start-up, a scavenger may be present in an amount less than 300 ppm, preferably less than 250 ppm, more preferably less than 200 ppm, even more preferably less than 150ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted. It is also contemplated that the catalyst system of this invention can be used exclusively upon start-up of a polymerization process which often requires the use of a scavenging component or, alternatively, the catalyst system of the invention may be used throughout the entire polymerization process.

In the most preferred embodiment of the invention the process is a gas phase polymerization process operating in a condensed mode. For the purposes of this patent specification and appended claims the process of purposefully introducing a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

EXAMPLES

In order to provide a better understanding of the present invention including representative advantages and limitation thereof, the following examples are offered.

The properties of the polymer were determined by the following test methods:

Melt Index is measured in accordance with ASTM D-128-Condition E.

Density is measured in accordance with ASTM-D-1238.

Bulk Density is measured as follows; the resin is poured via a ⅞" diameter funnel into a fixed volume cylinder of 400 cc; the bulk density is measured as the weight of resin in the cylinder divided by the 400 cc to give a value in g/cc.

Particle size is determined as follows; the particle size is measured by determining the weight of the material collected on a series of U.S. Standard sieves and determining the weight average particle size.

Fines are defined as the weight percentage of the total distribution passing through 120 mesh unit standard sieve.

EXAMPLE 1

Preparation of Catalyst A

Davison grade 948 silica (available from W. R. Grace, Davison Chemical Division, Baltimore, Md.) was dehydrated to 200° C. and used as the support. The dehydrated silica (800 g) was added into a 2 gal. reactor followed by toluene (2000 cc) and then 1060 cc of 30 wt % methylalumoxane (MAO) (available from Albemarle Corporation, Baton Rouge, La.) with slow agitation. The mixture was allowed to stir at 150° F. (66° C.) for 4 hours. Following the MAO reaction time, 23 grams of bis-(1-methyl-3- n-butyl cyclopentadienyl) zirconium dichloride was added as a 10 wt % solution in toluene. Reaction time for the metallocene was 1 hour after which the catalyst was dried with $N_2$ under a vacuum. Drying time was 3 hours at 150° F. (66° C.) and at a reduced agitator speed of 30 rpm. A total of 1200 gms of the dried free flowing catalyst system was isolated.

EXAMPLE 2

Preparation of Catalyst B

Into a 10 gal. reactor was added 23 liters of a 15 wt % trimethylaluminum (TMA) solution in heptane. While agitating the solution, 4.2 kg of silica (Davison 948 grade) was added slowly. The silica had a measured loss-on-ignition (LOI) of 12.5 wt % (LOI can be measured by determining the weight loss of the support material which has been held at temperature of about 1000° C. for about 16 hours) and was added via a dip tube slowly to prevent the reaction temperature from going above 50° F. (10° C.). After all of the silica was added, 94.5 g of bis(1-methyl-3-n-butylcyclopentadienylzirconium dichloride was added as a 10% solution in heptane. The mixture was then allowed to react while stirring for 1 hour at 150° F. (66° C.) after which the agitation was stopped; the slurry was allowed to settle and the liquid layer was removed by decanting. Four hexane washes were then carried out by introducing 20 liters of hexane each time, stirring, allowing the solids to settle and decanting. Drying of the catalyst system was then initiated with N$_2$ flow at 150° F. (66° C.) with slow intermittent agitation until the catalyst system was free flowing.

EXAMPLE 3

Preparation of Catalyst C

Into a 2 gallon reactor was charged first 1.1 liters of toluene then 0.93 liters of 30 wt % MAO solution in toluene(available from Albemarle), followed by 20.1 g of bis(1-methyl-3-n-butyl cyclopentadienyl) zirconium dichloride as a 10% solution in toluene. The mixture was stirred for 30 minutes at room temperature after which 350 g of silica (Davison 948 dehydrated at 600° C.) was added to the liquid with slow agitation. Stirring speed was increased for approximately 10 minutes to insure dispersion of the silica into the liquid and then 2 portions of 175 g of additional silica were added at slow agitation followed by increased stirring. After all of the silica (700 g) was introduced to the reactor 0.6 liters of toluene was added to make up a slurry of liquid to solid having a consistency of 4 cc/g of silica. Mixing was continued for 15 minutes at 120 rpm after which 5 g of surface modifier, Kemamine AS-990 available from Witco was dissolved in 100 cc of toluene and was added and stirred for 15 minutes. Drying was then initiated by vacuum and some N$_2$ purge at 175° F. (79.4° C.). When the catalyst system appeared to be free flowing it was cooled down and discharged into a nitrogen purged vessel. An approximate yield of 1.0 kg of dry catalyst system was obtained.

Polymerization

Into a 2 liter autoclave reactor under a nitrogen purge was charged with triethylaluminum (TEAL), followed by 60 cc of hexene-1 comonomer and 800 cc of isobutane diluent. The content of the reactor was heated to 80° C. after which 100 mg of catalyst was introduced concurrently with ethylene to make up a total reactor pressure of 325 psig (2240 kPa). The reactor temperature was maintained at 85° C. and the polymerization was allowed to proceed for 40 min. After 40 minutes the reactor was cooled, ethylene was vented off and the polymer dried and weighed to obtain the polymer yield. Table 1 provides the yield and activity data using metallocene catalyst with different levels of AS-990.

Examples 4–6 show the effect of surface modifier, Kemamine AS-990 (available from Witco) on the activity of Catalyst A. All polymerizations were carried out in an iso-butane slurry reactor as described above.

TABLE 1

| Example | AS-990 Amount[1] | Activity (g/PE/gCat · h) | Fouling |
|---------|------------------|--------------------------|---------|
| 4 | None | 1725 | Medium |
| 5 | 3 wt % | 1830 | None |
| 6 | 5 wt % | 1560 | None |

[1]Amount based on the weight of catalyst.

The above examples in Table 1 illustrate the use of Kemamine AS-990 (available from Witco) to the catalyst prior to polymerization does not have a negative effect on activity, and reactor fouling is virtually eliminated.

Examples 7–9 of Table 2 show the improved fouling effect of precontacting Catalyst A with a surface modifier, Atmer 163 (a tertiary fatty amine available from ICI Specialties, Wilmington, Del.) which has the similar chemical structure as Kemamine AS-650 (available from Witco). In these examples the catalyst system was slurried in hexane, the appropriate amount of Atmer 163 was added to the slurry and the mixture stirred at room temperature for 30 minutes. The catalyst systems were then dried. The resulting modified catalyst system was used in a polymerization process as described above in Example 3.

TABLE 2

| Example | Atmer 163 Amount[1] (wt %) | Activity (g/PE/gCat · h) | MI (dg/min) | MIR | Density (g/cc) | Fouling |
|---------|---------------------------|--------------------------|-------------|-----|----------------|---------|
| 7 | 0 | 1620 | 0.23 | 17.5 | 0.9168 | Medium |
| 8 | 2 | 1470 | 0.26 | 16.6 | 0.9159 | None |
| 9 | 3 | 1560 | 0.24 | 17.6 | 0.9156 | None |

[1]Amount based on the weight of catalyst system.

The above examples 7–9 of Table 2 illustrate that precontacting Catalyst A with Atmer 163 does not have a negative effect on the catalyst's performance, and that reactor fouling is eliminated.

Examples 10–15 show the effect of Kemamine AS-990 and AS-650 surface modifiers on the performance of Catalyst B.

TABLE 3

| Example | Surface Modifier | Amount (wt %) | Activity (g/PE/gCat · h) | Fouling |
|---------|------------------|---------------|--------------------------|---------|
| 10 | None | 0 | 1200 | High |
| 11 | AS990 | 3 | 1440 | None |
| 12 | AS990 | 3 | 1545 | None |
| 13 | None | 0 | 1170 | High |
| 14 | AS650 | 2.5 | 1470 | None |
| 15 | AS650 | 2.5 | 1410 | None |

The above examples 10–15 of Table 3 illustrate that surface modifiers such as Kemamine AS-650 and AS-990 have a beneficial effect on reactor operability.

Examples 18–20 illustrate the effect of the surface modifier, Kemamine AS-990 (available from Witco) on Catalyst C performance in the presence of different alkyl scavengers.

TABLE 4

| Example | Scavenger | Surf. Mod. Amount (wt %) | Activity (g/PE/gCat · h) | Fouling |
|---|---|---|---|---|
| 16 | TEAL | 0 | 1950 | Low |
| 17 | TEAL | 2 | 1695 | None |
| 18 | TIBAL | 0 | 2640 | Medium |
| 19 | TIBAL | 2 | 2430 | None |
| 20 | TIBAL | 4 | 2295 | None |

The above examples 16–20 of Table 4 show the benefit of the surface modifier in the presence of a scavenger.

EXAMPLE 21

Preparation Of Catalyst D

The metallocene catalyst was prepared from 800 lbs (364 kg) of silica (Davison 948) dehydrated at 600° C. The catalyst was a commercial scale catalyst prepared in a mixing vessel with an agitator. An initial charge of 1156 pounds (525 kg) toluene was added to the mixer. This was followed by mixing 925 pounds (420 kg) of 30 percent by weight methyl alumoxane in toluene. This was followed with 100 pounds (46 kg) of 20 percent by weight bis(1-methyl-3-n-butyl cyclopentadienylzirconium dichloride in toluene (20.4 pounds (9.3 kg) of contained metallocene). An additional 144 pounds (66 kg) of toluene was added to the mixer to rinse the metallocene feed cylinder and allowed to mix for 30 minutes at ambient conditions. The above mixture was added to the silica after which 54.3 pounds (25 kg) of a Kemamine AS-990 in toluene, surface modifier solution, containing 5.3 pounds (2.4 kg) of contained Kemamine AS-990. An additional 100 pounds (46 Kg) of toluene rinsed the surface modifier container and was added to the mixer. The resulting slurry was vacuum dried at 3.2 psia (70.6 KPa) at 175° F. (79° C.) to a free flowing powder. The final catalyst weight was 1093 pounds (497 kg). The catalyst had a final zirconium loading of 0.40% and an aluminum loading of 12.0%.

Polymerization

The polymerization was conducted in a commercial scale continuous gas phase fluidized bed reactor. The fluidized bed is made up of polymer granules. The gaseous feed streams of ethylene and hydrogen are introduced below the reactor bed into the recycle gas line. Hexene comonomer is introduced below the reactor bed in a separate line to the recycle gas line. An inert hydrocarbon such as isopentane is also introduced to the reactor in the recycle gas line. The isopentane is added to provide additional heat capacity to the reactor recycle gases. The individual flow rates of ethylene, hydrogen and comonomer were controlled to maintain fixed composition targets. The ethylene concentration was controlled to maintain a constant hydrogen to ethylene ratio. The concentration of the gases was measured by an on-line gas chromatograph to ensure relatively constant composition in the recycle gas stream. Triethyl aluminum (TEAL) as 2 percent by weight solution in isopentane carrier solvent was introduced into the fluidized bed for about 2 hours and 40 minutes at a rate of 32 lb/hr (15 kg/hr) prior to the introduction of the catalyst. Once the catalyst feed began TEAL introduction continued for about 1 hour and then was stopped. The total TEAL concentration based on bed weight was 122 ppm.

The solid catalyst was injected directly into the fluidized bed using purified nitrogen. The catalyst rate was adjusted to maintain a constant production rate. The reacting bed of growing polymer particles is maintained in a fluidized state by a continuous flow of the make up feed and recycle gas through the reaction zone. The reactor was operated at a total pressure of 310 psig (2138 kPa). To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the formation of the particulate product. The product is removed semi-continuously via a series of valves into a fixed volume vessels. These fixed volume vessels are vented back to the reactor through a recycle gas compressor which recovers reactor gases. The product is transferred to a purger vessel to remove entrained hydrocarbons.

EXAMPLE 22

Catalyst Preparation

Davison Grade 948 silica was hydrated and used as the support. Twentythree liters of a 15 weight percent TMA solution in hexane was charged into a ten gallon reactor equipped with an internal agitator. While agitating the TMA solution 4201 g of the hydrated silica was added at a slow rate of addition. The silica had a measured LOI (loss-on-ignition) of 11.7 weight percent. At the completion of the silica addition, 95 grams of bis(1-methyl-3-n-butyl cyclopentadienyl) zirconium dichloride was added and allowed to react while stirring at 42° C. The catalyst was then dried at approximately 60° C. under pressure and a nitrogen purge. A total of 4475 grams of catalyst was recovered. The catalyst was then reslurried in hexane. A solution of 118 grams of Kemamine AS-990 surface modifier in 500 cc of hexane was added and mixed for 30 minutes with the catalyst. The catalyst system was then dried as above.

Polymerization

The catalyst prepared in the above example was used in a continuous gas phase, fluid-bed reactor. The run conditions were as follows:

| Run Conditions | |
|---|---|
| Temperature (° C.) | 79 |
| Pressure (bar) | 21.7 |
| Ethylene (mole %) | 50 |
| Hydrogen (ppm) | 170 |
| Hexene (mole %) | 1.2 |
| TEAL Concentration (ppm) | 79 |
| Bed Weight (Kg) | 113 |
| Production Rate (Kg/Hr) | 28 |
| Catalyst Productivity (Kg/Kg) | 3050 |
| Bulk Density (g/cc) | 0.42 |
| Average Particle Size (microns) | 737 |
| Fines (% less than 120 microns) | 0.0 |

The reaction initiated smoothly with no indication of reactor instability. The reactor was operated at these conditions for about four days.

COMPARATIVE EXAMPLE 23

Catalyst Preparation

The same catalyst as prepared in Example 22 was used, however, the catalyst was not treated with the surface modifier.

Polymerization

While the catalyst and polymerization of Example 22 was in progress the catalyst of this example without the surface modifier was introduced after 4 days of stable operation with the catalyst having the surface modifier. Within one hour the catalyst feeder began to plug. Within three hours chips and sheets were observed in the discharged product. The amount of the chips and sheets increased from 109 g/hr to 623 g/hr after four hours more. At this point, the reactor discharge system plugged and a reactor shut down was required. When the reactor was opened and inspected, a large chunk of fused polymer was observed on the top of the distributor plate together with numerous smaller chips and sheets of polymer. Extensive reactor cleaning was needed. Run conditions at the time of the shutdown were as follows:

| Run Conditions | |
|---|---|
| Temperature (° C.) | 79 |
| Pressure (bar) | 21.7 |
| Ethylene (mole %) | 50 |
| Hydrogen (ppm) | 180 |
| Hexene (mole %) | 1.2 |
| TEAL Concentration (ppm) | 92 |
| Bed Weight (Kg) | 116 |
| Production Rate (Kg/Hr) | 26 |
| Catalyst Productivity (Kg/Kg) | 2670 |
| Bulk Density (g/cc) | 0.46 |
| Average Particle Size (microns) | 688 |
| Fines (% less than 120 microns) | 0.15 |

This example illustrates that unstable operations can be avoided by operating with a catalyst of the invention containing a surface modifier. The catalyst productivity was also lower and the percentage of fines in the polymer product increased. Within six hours of the introduction of the catalyst without the surface modifier the reactor had to be shut down.

While the present invention has been described and illustrated by reference to particular embodiments, it will be appreciated by those of ordinary skill in the art that the invention lends itself to variations not necessarily illustrated herein. The catalyst of the invention can be used in a single reactor or in a series reactor or even in series where one reactor is a slurry reactor and the other being a gas phase reactor. It is contemplated that the catalyst of the invention can be mixed with a traditional Ziegler-Natta catalyst or a catalyst of the invention can be separately introduced with a traditional Ziegler-Natta catalyst or any other metallocene catalyst system with or without a surface modifier. For this reason, then, reference should be made solely to the appended claims for purposes of determining the true scope of the present invention.

We claim:

1. A method for forming a supported metallocene catalyst system, the method comprising combining an inorganic oxide support material, a metallocene catalyst component, an activator and a surface modifier wherein the surface modifier is represented by the following formula:

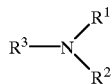

wherein $R^3$ is hydrogen or a branched or linear alkyl group having 1 to 50 carbon atoms; $R^1$ is hydrogen or a branched or linear alkyl group having 1 to 50 carbon atoms which may contain a heteroatom selected from O, N, P or S; and $R^2$ is $(CH_2)_x OH$ wherein x is an integer from 1 to 50 and wherein the weight percent of the surface modifier based on the total weight of the catalyst system is in the range of from 0.25 to 3.5 weight percent.

2. The method of claim 1 wherein the surface modifier is represented by the formula:

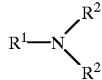

where $R^1$ is hydrogen or a linear or branched alkyl group of from 1 to 50 carbon atoms; $R^2$ is $(CH_2)_x OH$ wherein x is an integer from 1 to 50.

3. The method of claim 1 wherein the surface modifier is selected from at least one of the group of compounds represented by the following chemical formula: $C_{18}H_{37}N(CH_2CH_2OH)_2$, and $C_{12}H_{25}N(CH_2CH_2OH)_2$.

4. The method of claim 1 wherein the surface modifier is a mixture of compounds represented by the formula $RN(CH_2CH_2OH)_2$ wherein R is a $C_8$ to $C_{18}$ hydrocarbyl group.

5. The method of claim 1 wherein the surface modifier is a alkoxylated tertiary amine.

6. A method for producing a supported metallocene catalyst system, the method comprising the steps of:
   (a) contacting an inorganic oxide porous support material with at least one metallocene catalyst component and at least one activator; and then
   (b) adding at least one surface modifier, wherein the surface modifier is present in an amount of from about 0.05 to about 10 weight percent based on the total weight of the catalyst system wherein the surface modifier is represented by the formula:

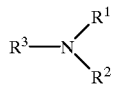

wherein $R^3$ is hydrogen or a branched or linear alkyl group having 1 to 50 carbon atoms; $R^1$ is hydrogen or a branched or linear alkyl group having 1 to 50 carbon atoms which may contain a heteroatom selected from O, N, P or S; and $R^2$ is $(CH_2)_x OH$ wherein x is an integer from 1 to 50.

7. The method of claim 6 wherein the porous carrier is contacted with the metallocene catalyst component prior to contact with the activator.

8. The method of claim 6 wherein the porous carrier is contacted with the activator prior to the metallocene catalyst component.

9. The method of claim 6 wherein the metallocene catalyst component and the activator are combined together to form a solution that is then combined with the porous carrier.

10. The method of claim 6 wherein the porous carrier contains water and is contacted with an organoaluminum compound to form the activator.

11. The method of claim 10 wherein the organoaluminum compound is trimethyl aluminum.

12. The method of claim 6 wherein the activator is alumoxane.

13. The method of claim 6 wherein the surface modifier is represented by the formula:

where $R^1$ is hydrogen or a linear or branched alkyl group of from 1 to 50 carbon atoms; $R^2$ is $(CH_2)_xOH$ wherein x is an integer from 1 to 50.

14. The method of claim 6 wherein the surface modifier is selected from at least one of the group of compounds represented by the following chemical formula: $C_{18}H_{37}N(CH_2CH_2OH)_2$, and $C_{12}H_{25}N(CH_2CH_2OH)_2$.

15. The method of claim 6 wherein the surface modifier is present in an amount in the range of 0.25 weight percent to less than about 3 weight percent based on the total weight of the supported catalyst system.

16. The method of claim 6 wherein the surface modifier is present in an amount in the range of 0.25 weight percent to less than about 3 weight percent present of the total weight of the supported catalyst system.

17. A catalyst system produced by the method of claim 1.

18. A catalyst system produced by the method of claim 6.

19. A process for polymerizing olefins alone or in combination with one or more other olefins, said process comprising polymerizing in the presence of the supported catalyst system of claim 1.

20. A process for polymerizing olefins alone or in combination with one or more other olefins, said process comprising polymerizing in the presence of the supported catalyst system of claim 6.

21. A continuous process for polymerizing monomer(s) in a fluidized bed reactor, said process comprising the steps of:

a) introducing a recycle stream into a reactor having fluidized bed, the recycle stream comprising monomer(s);

b) introducing a supported metallocene catalyst system into the reactor wherein the supported catalyst system comprises a carrier, a metallocene catalyst component, an activator, and a surface modifier wherein the surface modifier is represented by the following formula:

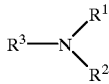

wherein $R^3$ is hydrogen or a branched or linear alkyl group having 1 to 50 carbon atoms; $R^1$ is hydrogen or a branched or linear alkyl group having 1 to 50 carbon atoms which may contain a heteroatom selected from O, N, P or S; and $R^2$ is $(CH_2)_xOH$ wherein x is an integer from 1 to 50 and wherein the weight percent of the surface modifier based on the total weight of the catalyst system is in the range of from 0.25 to 3.5 weight percent;

c) withdrawing the recycle stream from the reactor;

d) cooling the recycle stream;

e) introducing into the recycle stream additional monomer(s) to replace the monomer(s) polymerized f) reintroducing the recycle stream into the reactor; and g) withdrawing polymer product from the reactor.

22. The process of claim 21 wherein the recycle stream is cooled to form a liquid and a gas phase which is introduced into the reactor.

23. The process of claim 22 wherein the liquid and gas phase are introduced separately into the reactor.

24. The process of claim 22 wherein only the gas phase of the cooled recycle stream is introduced into the reactor.

25. The process of claim 21 wherein the monomer(s) are ethylene and alpha-olefins having from 3 to 20 carbon atoms.

26. The process of claim 21 wherein the liquid phase in the recycle stream is greater than about 2 to about 40 weight percent based on the total weight of the recycle stream.

27. The process of claim 21 wherein a scavenger is introduced at a concentration that is less than 300 ppm based on the total bed weight during the first 1 to 3 hours from the time the supported metallocene catalyst system is introduced into the reactor.

28. The process of claim 21 wherein the process is operating in a condensed mode.

29. The process of claim 21 wherein after step (c) another metallocene catalyst system comprising a metallocene catalyst component and activator is introduced into the reactor.

30. The process of claim 21 wherein the process further comprises introducing a traditional Ziegler-Natta catalyst.

* * * * *